(12) United States Patent  
Wong (10) Patent No.: US 6,694,242 B2  
(45) Date of Patent: Feb. 17, 2004

(54) DUAL FUEL ENGINE HAVING MULTIPLE DEDICATED CONTROLLERS CONNECTED BY A BROADBAND COMMUNICATIONS LINK

(75) Inventor: Hoi-Ching Wong, San Diego, CA (US)

(73) Assignee: Clean Air Power, Inc., San Diego, CA (US)

( * ) Notice: Subject to any disclaimer, the term of this patent is extended or adjusted under 35 U.S.C. 154(b) by 5 days.

(21) Appl. No.: 10/102,400

(22) Filed: Mar. 20, 2002

(65) Prior Publication Data

US 2003/0187565 A1 Oct. 2, 2003

(51) Int. Cl.$^7$ .................. G06F 17/00; F02D 41/04; F02M 21/02
(52) U.S. Cl. .................. 701/104; 123/526; 123/25 C
(58) Field of Search ................ 123/25 R, 25 A, 123/25 C, 27 GE, 396, 525, 526, 568.11, 568.21, 575; 701/101, 102, 103, 104, 105, 108, 114, 115, 29, 30, 50; 60/274, 284, 285; 423/213.5; 340/870.14; 307/10.1

(56) References Cited

U.S. PATENT DOCUMENTS

| | | | |
|---|---|---|---|
| 4,603,674 A | | 8/1986 | Tanaka ................ 123/575 |
| 5,444,626 A | * | 8/1995 | Schenk ................ 701/102 |
| 5,450,829 A | | 9/1995 | Beck ................ 123/435 |
| 5,451,385 A | * | 9/1995 | Hansel et al. .......... 423/213.5 |
| 5,524,432 A | * | 6/1996 | Hansel ................ 60/274 |
| 5,546,306 A | | 8/1996 | Hirabayashi et al. ...... 701/35 |
| 5,628,294 A | | 5/1997 | Krieckaert et al. ...... 123/575 |
| 6,073,592 A | | 6/2000 | Brown et al. ........... 123/27 GE |
| 6,144,910 A | * | 11/2000 | Scarlett et al. ........ 701/50 |
| 6,278,932 B1 | * | 8/2001 | Baumel et al. ......... 701/104 |
| 6,525,432 B2 | * | 2/2003 | Heckmann et al. ...... 307/10.1 |
| 6,587,767 B2 | * | 7/2003 | Letang et al. ......... 701/29 |
| 2002/0167419 A1 | * | 11/2002 | Haimerl et al. ........ 340/870.14 |
| 2003/0074118 A1 | * | 4/2003 | Rogg et al. .......... 701/50 |
| 2003/0075145 A1 | * | 4/2003 | Sheidler et al. ....... 123/396 |
| 2003/0163587 A1 | * | 8/2003 | Knight et al. ......... 701/29 |

OTHER PUBLICATIONS

VECTOR Application Note, *Introduction to CAN* (undated).

\* cited by examiner

*Primary Examiner*—Willis R. Wolfe
(74) *Attorney, Agent, or Firm*—Boyle Fredrickson Newholm Stein & Gratz S.C.

(57) ABSTRACT

A control system for a dual fuel engine that can operate in either dual fuel mode or in diesel only mode includes two controllers. One controller controls operation of the gaseous fuel supply system, and the other controls the liquid fuel supply system. Each controller receives signals from sensors monitoring particular engine operation characteristics and is able to transmit the data it collects to the other controller by way of a broadband communications link such as a controller area network (CAN). When the engine is operating in dual fuel mode, one controller directly controls the gaseous fuel supply and also controls the liquid fuel supply by its control of the other controller. When the engine is operating in diesel only mode, the other controller controls all aspects of engine operation. A method of controlling operation of a dual fuel engine is also disclosed.

25 Claims, 4 Drawing Sheets

DUAL FUEL ENGINE HAVING MULTIPLE DEDICATED CONTROLLERS CONNECTED BY A BROADBAND COMMUNICATIONS LINK

BACKGROUND OF THE INVENTION

1. Field of the Invention

The invention relates to dual fuel engines and, more particularly, relates to a system and method for coordinating operation of multiple dedicated controllers to control operation of gaseous fuel and liquid fuel supply systems of a dual fuel engine. The invention additionally relates to an engine incorporating such a control system.

2. Discussion of the Related Art

Recent years have seen an increased demand for the use of gaseous fuels as a primary fuel source in compression ignition engines. Gaseous fuels such as propane or natural gas are considered by many to be superior to diesel fuel and the like because gaseous fuels are generally less expensive, provide equal or greater power with equal or better mileage, and produce significantly lower emissions. This last benefit renders gaseous fuels particularly attractive because recently enacted and pending worldwide regulations may tend to prohibit the use of diesel fuel in many engines. The attractiveness of gaseous fuels is further enhanced by the fact that existing compression ignition engine designs can be readily adapted to burn gaseous fuels.

One drawback of gaseous fuels is that they exhibit significantly higher ignition temperatures than do diesel fuel, oil, and other liquid fuels traditionally used in compression ignition engines. In fact, the temperature of gaseous fuels does not increase sufficiently during operation of standard compression ignition engines for auto-ignition. This problem can be overcome by injecting limited mounts of pilot fuel, typically diesel fuel or lube oil, into the cylinders of the engine in the combustion chamber. The pilot fuel ignites upon injection and burns at a high enough temperature to ignite a gaseous fuel charge in the combustion chamber. Engines fueled in this manner are usually referred to as "dual fuel engines." Some dual fuel engines are at least selectively additionally operable in either a "dual fuel mode" as described earlier in this paragraph or in a "diesel only mode" in which the engine's gaseous fuel supply system is disabled and the liquid fuel supply system is controlled to effect a standard diesel cycle.

At least one known dual fuel engine is operated by two dedicated controllers. The first, or dual fuel controller, is configured to control operation of the gaseous fuel supply system of the engine. The second, or diesel controller, is configured to control operation of the liquid fuel supply system of the engine. In the dual fuel mode, the dual fuel controller controls operation of the diesel controller in a master-slave relationship, with the diesel controller controlling liquid fuel supply timing and/or quantity as commanded by the dual fuel controller and the dual fuel controller controlling all other aspects of engine operation. In the diesel only mode, the gaseous fuel supply system is disabled and the traditional diesel cycle operation is maintained by the diesel controller.

The controllers of the system described above are coupled to one another by a hardwire link consisting of three lines. The diesel controller transmits desired engine speed to the dual fuel controller via one of these lines. The dual fuel controller responds by transmitting a diesel fuel injection quantity and timing command to the diesel controller over another of the lines. The hardwire interface is incapable of transmitting any information other than these specific, simple commands. As a result, all information required by both controllers for the performance of their functions must come from dedicated inputs. Each controller therefore requires a dedicated intake air temperature sensor, a dedicated intake air pressure sensor, and a dedicated input/output port for communicating with a manual interface such as a laptop computer. This need for redundancy considerably increases the complexity and expense of the control system. The duplicate sensors can also be difficult to physically incorporate into some engine designs. Similarly, some vehicle dashboards have less than ample room for multiple input/output ports. Moreover, the need to program both controllers individually requires substantial duplication of programming effort.

The hardwire interface employed by the control system described above also is susceptible to interference from external electrical signals. The resultant noise can hinder the transfer of information between the controllers, sometimes to the point that the system cannot differentiate signals of interest from noise.

The need therefore has arisen to increase the communication capabilities between the controllers of a dual fuel engine in order to simplify the structural and functional requirements of the system.

The need has additionally arisen to facilitate the programming of the controllers of a dual fuel engine.

The need also has arisen to facilitate the additional sub-system(s) such as EGR, water injection and/or other aftertreatment and pretreatment systems added on to the existing engine combustion control system.

SUMMARY OF THE INVENTION

In accordance with a first aspect of the invention, a dual fuel engine control system is provided with first and second dedicated controllers, each controlling some aspects of the operation of a dual fuel engine.

In accordance with a second aspect of the invention, the first and second controllers are linked together to allow them to share information for use in controlling operation of the engine.

An additional dedicated subsystem controller may also be provided with communication capability with the broadband communications link and operable to control another subsystem of the engine based at least in part on information transmitted to it over the broadband communications link.

In accordance with a third aspect of the invention, a method is provided for collecting data regarding engine operation, transmitting data from data collection sensors to the controllers, transmitting data between the controllers, and using the controllers to control the operation of the engine based on the engine operation data.

In accordance with a fourth aspect of the invention, the controllers are linked together with a broadband link.

Other aspects and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications could be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
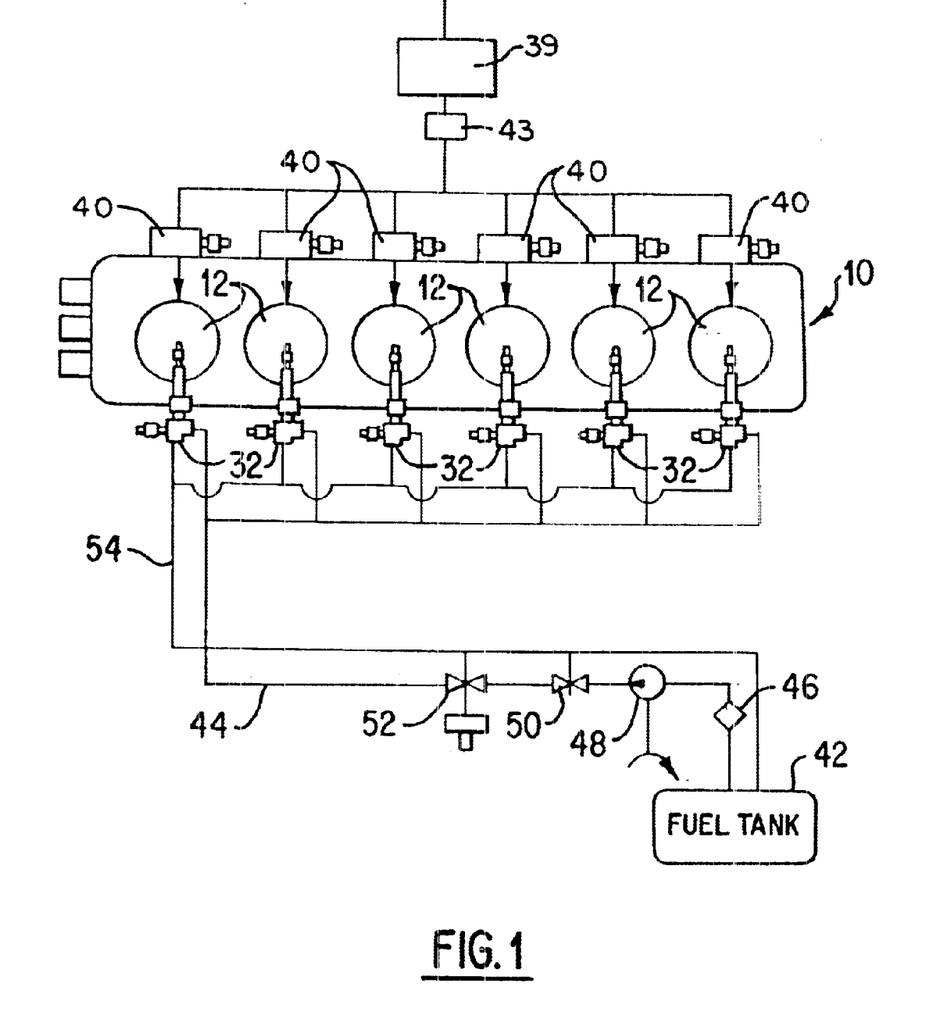
FIG. 1 is a schematic view of a dual fuel engine constructed in accordance with a preferred embodiment of the invention and of fuel supply systems for the engine.
Figure 2:
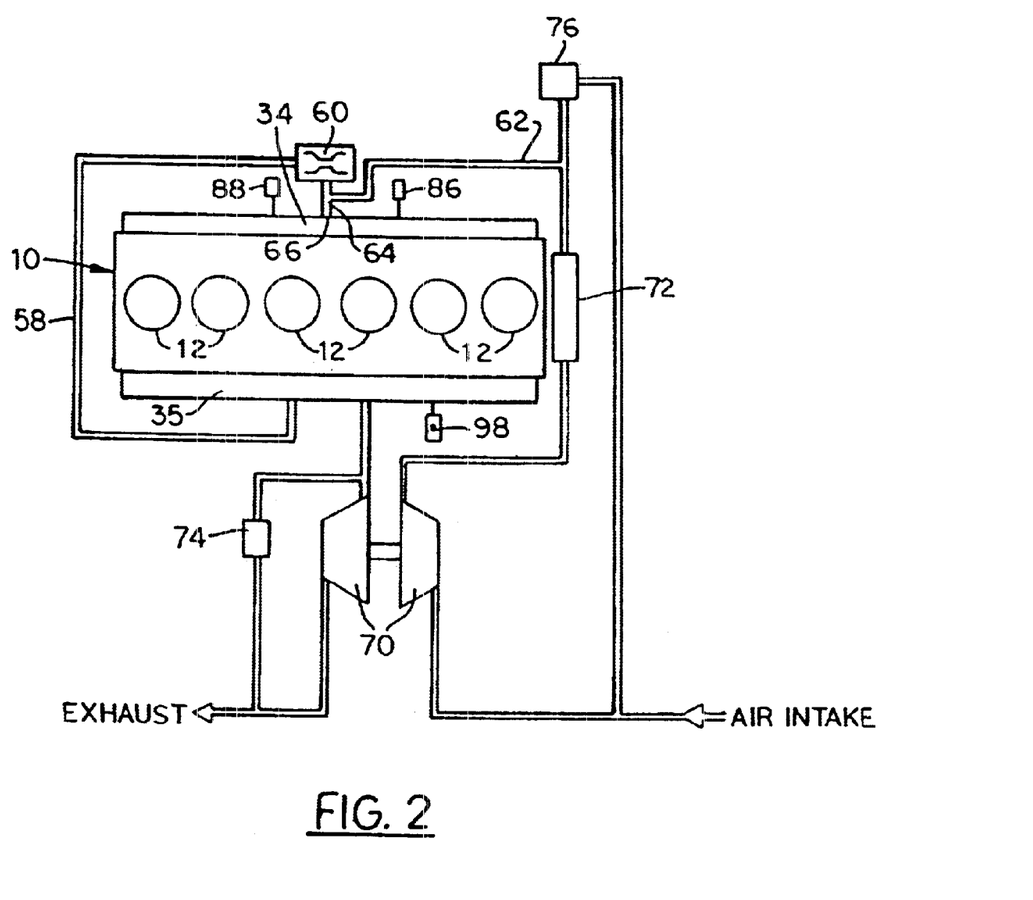
FIG. 2 is schematic view of the engine of FIG. 1 and of the air supply system for the engine.
Figure 3:
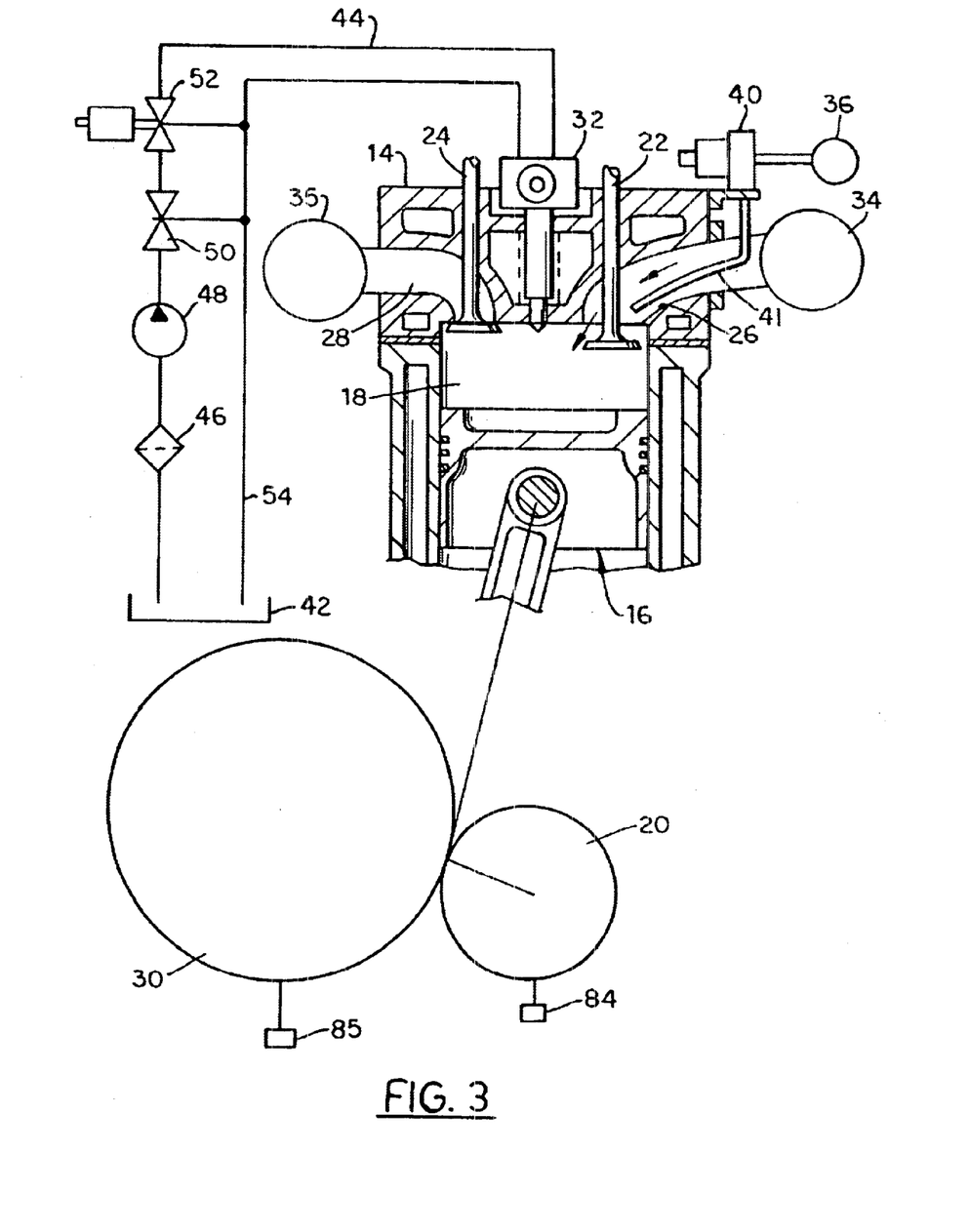
FIG. 3 is a partially schematic, sectional side elevation view of a cylinder of the engine of FIGS. 1 and 2 and of associated engine components.

Referring now to FIGS. 1–3, an engine 10 is illustrated that incorporates a control system constructed in accordance with a preferred embodiment of the invention. Before discussing the engine and the associated control system in detail, it must be emphasized that they are exemplary only and that the invention as claimed herein is usable with a wide variety of dual fuel engines incorporating a wide variety of gaseous fuel supply systems, liquid fuel supply systems, and air supply systems.

The exemplary engine 10 illustrated in FIGS. 1–3 is a compression ignition-type internal combustion engine having a plurality of cylinders 12, each capped with a cylinder head 14 (FIG. 3). As is also shown in FIG. 3, a piston 16 is slidably disposed in the bore of each cylinder 12 to define a combustion chamber 18 between the cylinder head 14 and the piston 16. Piston 16 is also connected to a crankshaft 20 in a conventional manner. Conventional inlet and exhaust valves 22 and 24 are provided at the end of respective passages 26 and 28 in the cylinder head 14 and are actuated by a standard camshaft 30 so as to control the supply of an air/fuel mixture to and the exhaust of combustion products from the combustion chamber 18. Gases are supplied to and exhausted from engine 10 via an intake air manifold 34 and an exhaust manifold 35, respectively. However, unlike in conventional engines, a throttle valve which would normally be present in the intake manifold 34 is absent or at least disabled, thereby producing an "unthrottled" engine. An intake air control system may also be provided for reasons detailed below.

Gaseous fuel could be supplied via a single metering valve discharging into a single throttle body at the entrance of the manifold 34, via a similarly-situated mechanically controlled valve, or even via a high pressure direct injector that injects fuel directly into the combustion chamber 18. In the illustrated embodiment, however, a separate external injector 40 is provided for each cylinder 12. Each injector 40 receives natural gas, propane, or another gaseous fuel from a common tank 39 and a manifold 36 and injects fuel directly into the inlet port 26 of the associated cylinder 12 via a line 41. Gas flow to the injectors 40 can be disabled by closing a shutoff valve 43 located in the line leading to the manifold 36.

The illustrated engine 10 employs multiple electronically controlled liquid fuel injectors 32 as pilot fuel injectors. Each pilot fuel injector 32 could comprise any electronically controlled injector and preferably takes the form of an electro-hydraulic fuel injector, more preferably a pressure-intensified accumulator-type injector of the type disclosed in Reissue U.S. Pat. No. 33,270. Referring to FIGS. 1 and 3, injector 32 is fed with diesel fuel or the like from a conventional tank 42 via a supply line or common rail 44. Disposed in line 44 are a filter 46, a pump 48, a high pressure relief valve 50, and a pressure regulator 52. A return line 54 also leads from the injector 32 to the tank 42. Referring to FIG. 2, the air intake control system may include (1) an exhaust gas recirculation (EGR) subsystem permitting recirculated exhaust gases to flow from an exhaust manifold 35 to the intake manifold 34 and/or (2) a turbocharging subsystem which charges non-EGR air admitted to the intake manifold 34. The EGR subsystem is useful for increasing combustion reactivity and extending the upper limit for optimum air fuel ratio (lambda). The EGR subsystem has an EGR metering valve located in a return line 58 from the exhaust manifold 35 to the intake manifold 34. Valve 60 has an outlet connected to an intake line 64 leading to an intake port 66 of the intake manifold 34. A second line 62 leads from a turbo bypass valve 76 to the line 64 downstream from valve 60.

As is further shown in FIG. 2, the turbocharging subsystem of the intake air control system includes a turbocharger 70 and an aftercooler 72 provided in line 62 upstream of the valve 60 and intake port 66. Operation of the turbocharger 70 is controlled in a conventional manner by a turbo wastegate control valve 74 and a turbo air bypass valve 76.

Figure 4:
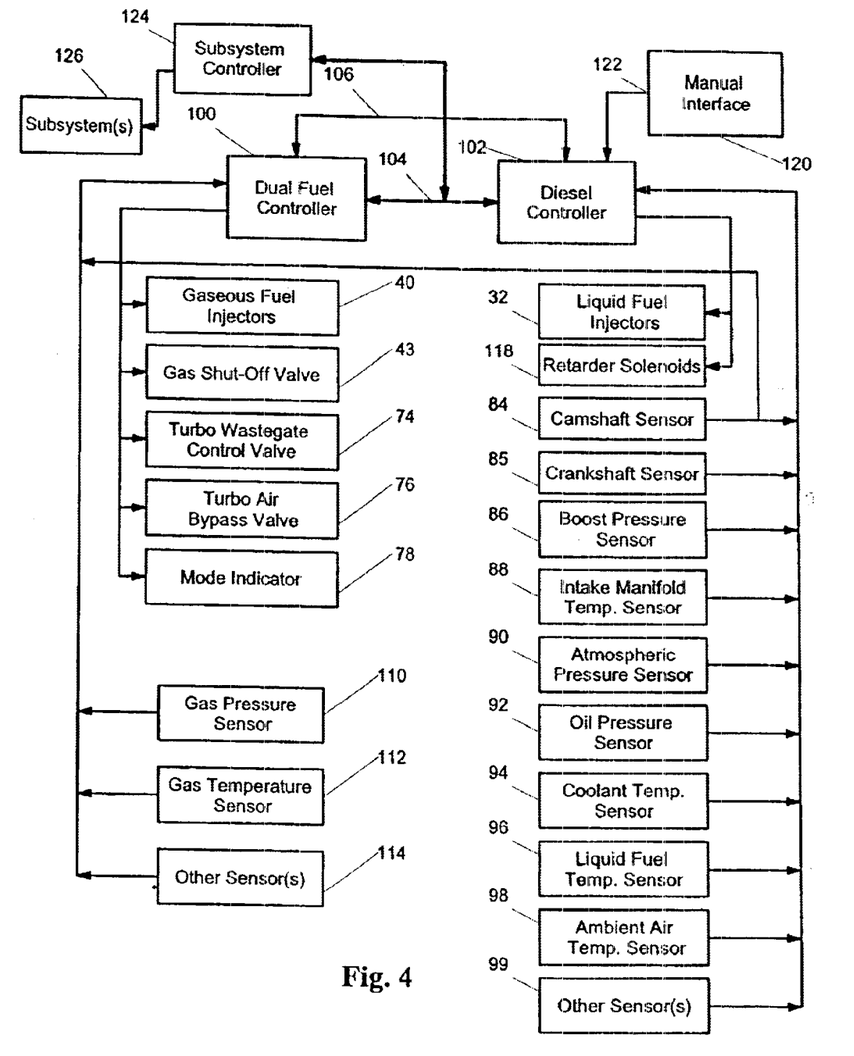
FIG. 4 is a schematic control diagram of the engine of FIGS. 1 and 2.

Referring now to FIG. 4, all of the controlled components of the engine are controlled via a control system that includes multiple dedicated controllers 100 and 102 connected to one another via a broadband communications link 104. (The term "dedicated controller," as used herein, means that the controller controls only the engine 10, not other engines slaved to or otherwise operably connected to the engine.) In the illustrated embodiment, the controller 100 is a dual fuel controller and the controller 102 is a diesel controller. The dual fuel controller 100 is configured, based on information received directly from sensors and from information received from the diesel controller 102 via the link 104, to control operation of the gaseous fuel supply system. The diesel controller 102 is configured, based on information received directly from sensors and from information received from the dual fuel controller 100 via the link 104, to control operation of the liquid fuel supply system. The controllers 102 and 104 are also preferably programmed so that the engine 10 can be operated in both a dual fuel mode and a diesel only mode. In this case, dual fuel controller 100 is configured to control the diesel controller 102 in a master-slave relationship when the engine is operating in the dual fuel mode, and the diesel controller 102 is configured to control all aspects of engine operation when the engine 10 is operating in the diesel only mode.

Both controllers 100 and 102 may comprise any of a variety of commercially available programmable systems, preferably a programmable electronic control unit (ECU). A programmable ECU that is well-suited for use as the dual fuel controller 100 is available from Clean Air Partners, Inc. of San Diego, Calif. under the designation Eagle. A programmable ECU that is well-suited for use as the diesel controller 102 is available from Caterpillar, Inc. of Peoria, Ill. under the designation Advanced Diesel Engine Management (ADEM). The broadband communications link 104 may comprise any link permitting broadband two-way communication between the controllers 100 and 102. The bandwidth provided by the link 104 should be sufficient to permit information concerning the current operational state of the engine 10, as monitored by the sensors, to be transmitted between the controllers 100 and 102 by the link 104 while simultaneously permitting commands to be transmitted over the link 104. The link 104 should also be sufficient to permit it to transmit programming information to be transmitted over the link. It also should preferably be relatively immune to interference from noise. A preferred link is a so-called controller area network or CAN, originally developed by Bosch and now available, e.g., from Bosch, Motorola, Philips, Intel, and Infineon. A CAN is an object address oriented network, in which all connected parts of a system (the controllers 100 and 102 in the disclosed application of the network) are offered the full length of a data bus. Each individual part of the system only reads the particular part of the data bus which is relevant for it. Thus, individual parts of the system communicate in a similar way by sending a message on the bus addressed to other specific parts of the network. All CAN nodes are able to transmit data, and several CAN nodes can request the bus simultaneously. A transmitter sends a message to all CAN nodes (broadcasting). Each node decides whether or not it should process the message on the basis of the identifier received. The identifier also determines the priority that the message enjoys in competition for bus access. The currently preferred CAN operates to the J1939 protocol standard, which has been adopted by the Society of Automotive Engineers SAE for automotive applications.

The controllers 100 and 102 are also additionally connected to one another by a traditional hardwire link 106. The link 106 provides limited back-up communications capability in the event of CAN overload. Specifically, when the engine 10 is operating in dual fuel mode, the commanded liquid fuel quantity is transmitted to the diesel controller 102 from the dual fuel controller 100 by both the CAN 104 and by the hardwire link 106. This redundant transmission assures timely receipt of the fuel command signal by the controller if the CAN is temporarily busy transmitting other information.

Still referring to FIG. 4, the gaseous fuel supply system components are coupled to the dual fuel controller 100, and the liquid fuel supply system components are coupled to the diesel controller 102. Importantly, information required by both controllers 100 and 102 is obtained in each case by a single sensor and transmitted to only one of the controllers. The information is then relayed to the other controller via the CAN 104, thereby negating the need to incorporate redundant sensors into the control system. Examples of information obtained via a single source and shown in this manner is information indicative of intake manifold air temperature, intake manifold air pressure, and engine speed. The information relayed over the CAN 104 is also relatively noise-free when compared to information relayed via a hardwire link, enhancing system reliability and versatility.

In the illustrated embodiment, the dual fuel controller 100 receives signals from a gas pressure sensor 110 and a gas temperature sensor 112, and possibly other sensors collectively denoted 114. The diesel controller 102 receives engine timing/speed signals from a camshaft speed/timing sensor 84, which is also preferably connected directly to the dual fuel controller 100, and from a crankshaft speed/timing sensor 85. The diesel controller 102 also receives signals from a boost pressure sensor 86, an intake manifold air temperature sensor 88, an atmospheric air pressure sensor 90, an oil pressure sensor 92, a coolant temperature sensor 94, a diesel fuel temperature sensor 96, an ambient air temperature sensor 98, and possibly other sensors, collectively denoted 99. One or both of the controllers 100, 102 may also ascertain exhaust gas absolute pressure (EGAP) either directly from an EGAP sensor or indirectly from an exhaust back pressure (EBP) sensor (neither of which is shown). Other values, such as indicated mean effective pressure (IMEP) and the volume and quantity of gas ($Q_{gas}$ and $V_{gas}$, respectively) injected are calculated by the controller(s) 100 and/or 102 using data from one or more of the sensors 80–99 and known mathematical relationships. Still other values, such as maximum intake manifold absolute pressure ($MAP_{max}$), maximum indicated mean effective pressure ($IMEP_{max}$), maximum engine speed ($RPM_{max}$), volumetric efficiency ($T_{vol}$), and various system constants are preferably stored in a ROM or other storage device of one or both of the controllers 100 and 102. Based on these received and calculated values, the dual fuel controller 100 transmits signals to the gas injectors 40, the gas shut-off valve 43, the turbo wastegate control valve 74, the TAB valve 76, and an indicator 78. (The indicator 78 provides a visual indication of the current operational state of the engine 10, i.e., dual fuel mode or diesel only mode). Similarly, the diesel controller 102 is operable, based on information obtained directly from the sensors 84–86, etc. and information received from the dual fuel controller 100 via the CAN 104, to control operation of the diesel injectors 32 and possibly other equipment such as retarder solenoids 118.

CAN 104 can also accommodate one or more sub-system controllers, such as the illustrated controller 124 in FIG. 4. The controller 124 controls one or more subsystems such as the subsystem 126 in FIG. 4 using information obtained from the sensors and/or the controllers 100 and 102 and transmitted over CAN 104. The controlled subsystem 126 may, for example, be an EGR subsystem, a water injection subsystem and/or another aftertreatment and/or pretreatment subsystem.

The CAN 104 is also operable to facilitate troubleshooting and programming of both controllers 100 and 102 using a single manually operated interface, such as a laptop computer 120, and to permit programming data relevant to a controller 100 or 102 to be transmitted to and from that controller 100 or 102 via the CAN 104. (The terms "programming commands," "programming data," and the like, as used herein, are broadly defined to compass virtually any commands or data transmitted to or from a controller and a manual interface unit.) The computer 120 is coupled to one of the controllers (the diesel controller 102 in the illustrated embodiment) via an input/output port 122 on the vehicle dashboard. Programming information for the diesel controller 102 is transmitted directly to that controller from the input/output port 122. Programming information for the dual fuel controller 100 is transmitted to and from the controller 100 via the input/output port 122, the diesel controller 102, and the CAN 104. Alternatively, the laptop computer 120 could be directly connected to both controllers 100 and 102 via a splitter (not shown) located between the input/output port 122 and the controllers 100, 102. In either event, the laptop 120 can communicate with both controllers 100 and 102 simultaneously. Programming commands that are common to both controllers 100 and 102 therefore need only be entered once. Diagnostic information can also be transmitted to and from the computer 120 in the same manner. This arrangement is considerably simplified in comparison to prior systems in which each controller would have to be programmed individually via a separate input/output port.

In use, during dual fuel operation of the system, the dual fuel controller 100 controls operation of the gas injectors 40, gas shut off valve 43, turbo wastegate control valve 74, TAB valve 76, gas injectors 40, and possibly other system components. The components preferably are manipulated to control the timing and/or quantity of gaseous fuel injection and/or other characteristics of the gaseous fuel charge, such as lambda, to optimize one or more desired engine operational characteristics. The optimized characteristic(s) may, for example, be performance and/or one or more emissions. The dual fuel controller 100 also transmits a command signal to the diesel controller 102 via the CAN 104 to inject liquid fuel at a timing and quantity determined by the dual fuel controller 100. Hence, the diesel controller 102 is controlled in a master-slave relationship, but acts as a conduit for some information required by the dual fuel controller 100 to control engine operation. Conversely, when the engine 10 is operating in a diesel-only mode, the gas shut-off valve 43 is closed, and the engine is controlled exclusively by the diesel controller 102. Selection between these two modes may occur manually via a suitable switch, but preferably occurs automatically based on a determined ability of the engine 10 to effectively operate in dual fuel mode under prevailing engine operational characteristics. This determination is preferably made by the dual fuel controller 100 based on signals received directly from the sensors and/or indirectly from the diesel controller 102 via the CAN 104. Preferably, in the absence of a system fault, the engine 10 runs in diesel only mode only during engine start and warm-up, and otherwise runs in dual fuel mode.

The nature and frequency of the information transmitted over the CAN 104 during this operation is summarized in Table 1:

TABLE 1

| Description | From | To | Interval |
|---|---|---|---|
| Mode indicator | Diesel Controller | Dual Fuel Controller | Every 15 ms |
| Commanded fuel in mm³ diesel equivalent | Diesel Controller | Dual Fuel Controller | Every 15 ms |
| Desired diesel injection quantity in mm³ | Dual Fuel Controller | Diesel Controller | Every cylinder firing |
| Desired EUI solenoid start of current in CA BTDC | Dual Fuel Controller | Diesel Controller | Every cylinder firing |
| Fuel limiting status | Dual Fuel Controller | Diesel Controller | Every cylinder firing |
| Exiting Dual-Fuel mode | Dual Fuel Controller | Diesel Controller | Every 15 ms |
| Intake manifold air temperature | Diesel Controller | Dual Fuel Controller | Every 20 ms |
| Intake manifold absolute pressure | Diesel Controller | Dual Fuel Controller | Every 10 ~ 15 ms |
| Atmospheric pressure | Diesel Controller | Dual Fuel Controller | Every 100 ms |
| Engine coolant temperature | Diesel Controller | Dual Fuel Controller | Every 100 ms |
| Engine load factor | Diesel Controller | Dual Fuel Controller | Every 50 ms |
| Vehicle speed | Diesel Controller | Dual Fuel Controller | Every 50 ms |
| Lifetime total diesel fuel used in gallons | Diesel Controller | Dual Fuel Controller | Every 1 second |
| Lifetime total natural gas fuel used in DEG | Dual Fuel Controller | Diesel Controller | Every 1 second |
| Lifetime total diesel fuel used while indual fuel mode | Dual Fuel Controller | Diesel Controller | Every 1 second |
| Lifetime total fuel used in DEG while in dual fuel mode | Dual Fuel Controller | Diesel Controller | Every 1 second |
| Lifetime total fuel used in DEG | Dual-Fuel Controller | Diesel Controller | Every 1 second |
| Active and logged diagnostics | Dual-Fuel Controller | Diesel Controller | Every 1 second |
| Lifetime total distance | Diesel Controller | Dual Controller | Every 1 second |

The apportionment of control and display functions between the controllers 100 and 102 during this operation is summarized in Table 2:

TABLE 2

| Features | Diesel Controller | Dual-Fuel Controller |
|---|---|---|
| ECM control switching | | |
| Prior to Dual-Fuel mode | ✓ | ✓ |
| Exiting Dual-Fuel Mode | ✓ | ✓ |
| Mode indicator | ✓ | ✓ |
| Engine speed governing | | |
| Low and high idle speed governing | ✓ | |
| Cruise control and vehicle speed limit governing | ✓ | |
| All speed governing | ✓ | |
| Min/Max governing (Optional) | ✓ | |
| Fuel Limiting | | |
| Torque limit - Maximum fuel delivery | ✓ | ✓ |
| Lambda control | | ✓ |
| High ACT derate | | ✓ |
| High inlet air temperature warning | ✓ | ✓ |
| Low oil pressure warning/derate/shutdown | ✓ | |
| High coolant temperature warning/derate/shutdown | ✓ | |
| High diesel fuel temperature warning | ✓ | ✓ |
| Low gas inlet pressure | | ✓ |
| Fuel and air management | | |
| Diesel fuel injection timing and quantity | | ✓ |
| Natural gas injection timing and quantity | | ✓ |
| Diesel fuel compensation for diesel fuel temperature | ✓ | |
| Natural gas quantity compensation for gas pressure and temperature, gas injector solenoid voltage | | ✓ |
| E-trim each diesel injector | ✓ | |
| Disable wastegate of turbocharger | | ✓ |
| TAB valve control | | ✓ |
| Skip-Fire - Number of firing cylinders | | ✓ |
| Fan control for inlet air temperature | ✓ | |
| Calibrations | | |
| Engine power | ✓ | ✓ |
| Speed/timing sensor | ✓ | |
| Pressure sensors (absolute to gauge pressure) | ✓ | ✓ |
| ATA Data Link Interfaces | | |
| Flash programming | ✓ | ✓ |
| Service tools | ✓ | ✓ |
| CAN SAE J1939 Data Link | | |
| Exchange information among ECMs | ✓ | ✓ |
| Flash programming | ✓ | ✓ |
| Information Management | | |
| Duel-Feul active and logged diagnostics | | ✓ |
| Logged Dual-Fuel events | | ✓ |
| Failed SOV | | ✓ |
| Leaking gas injectors | | ✓ |
| High and low gas pressure | | ✓ |
| High and low gas temperature | | ✓ |
| Failed TAB valve | | ✓ |
| ECMS communication failure | ✓ | ✓ |
| Dual-Fuel operation data | | |
| Current totals | | |
| Lifetime total hours | ✓ | ✓ |
| Dual-Fuel operation total hours | ✓ | ✓ |
| Natural gas fuel used | ✓ | ✓ |
| Total fuel used during Dual-Fuel operation | ✓ | ✓ |
| Total fuel used | ✓ | ✓ |
| Fleet trip data | | |
| Fleet trip totals | | ✓ |

TABLE 2-continued

| Features | Diesel Controller | Dual-Fuel Controller |
|---|---|---|
| Histograms | | ✓ |
| Custom data | | ✓ |
| Engine snapshot data | | ✓ |
| On-Vehicle System Tests | | |
| Cylinder cutout - diesel | ✓ | |
| Diesel injector solenoid test | ✓ | |
| Gas injector solenoid test | | ✓ |
| SOV test | | ✓ |
| Security | | |
| ECM/PM interlock | ✓ | ✓ |
| Customer parameter tattletales | ✓ | ✓ |
| Last service tool serial numbers | ✓ | ✓ |
| Three-level passwords | ✓ | ✓ |

Many changes and modifications could be made to the invention without departing from the spirit thereof. The scope of these changes will become apparent from the appended claims.

We claim:

1. A dual fuel engine control system comprising:
   (A) a first, dedicated controller for controlling operation of some operational aspects of a dual fuel engine;
   (B) a second, dedicated controller for controlling operation of some operational aspects of the dual fuel engine; and
   (C) a broadband communications link that couples said first and second controllers together so as to permit either of said controllers to operate based at least on part on information input to only one of said controllers.

2. The control system as recited in claim 1, wherein said broadband communications link comprises a controller area network (CAN).

3. The control system as recited in claim 1, wherein
   the engine is operable in both a dual fuel mode and a diesel only mode,
   said first controller is configured to control a gaseous fuel supply device of the engine,
   said second controller is configured to control a liquid fuel supply device of the engine, and
   said first controller is configured to control said second controller in a master-slave relationship when the engine is operating in the dual fuel mode.

4. The control system as recited in claim 1, wherein said second controller is configured to control all aspects of engine operation when the engine is operating in the diesel only mode.

5. The control system as recited in claim 1, further comprising a plurality of sensors that are configured to monitor engine operation and to transmit data to said first and second controllers, at least one of said sensors being configured to transmit data directly to one of said controllers, and said broadband communications link being operable to transmit data from said one sensor to the other of said controllers from said one controller.

6. The control system as recited in claim 1, further comprising a single input/output port adapted to transmit data from a manual interface device to both of said controllers.

7. The control system as recited in claim 6, wherein said input/output port is coupled to only one of said controllers, and wherein said broadband communications link is configured to transmit programming data to the other controller from the manual interface device and said one controller.

8. The control system as recited in claim 1, further comprising a third dedicated controller that is coupled to said broadband communications link and that controls another subsystem of the engine based at least on part on information input to only one of said first and second controllers and transmitted to said third controller over said broadband communications link.

9. The control system as recited in claim 8, wherein said third controller controls at least one of an EGR subsystem and a water injection subsystem.

10. A dual fuel engine control system comprising:
    (A) a plurality of sensors configured to monitor operation of the engine, said sensors including a single intake air pressure sensor and a single intake air temperature sensor;
    (B) a dedicated dual fuel controller configured to receive signals from at least some of said sensors;
    (C) a dedicated diesel controller configured to receive signals from at least others of said sensors; and
    (D) a controller area network (CAN) that couples said dual fuel controller and said diesel controller to one another, said CAN providing two-way broadband communication between said controllers, wherein the engine is operable in both a dual fuel mode and a diesel only mode;
    the dual fuel controller is configured, based on information received directly from said same sensors and on information received from said diesel controller via said CAN, to control operation of a gaseous fuel supply device of the engine;
    said diesel fuel controller is configured, based on information received directly from said other sensors and from information received from said dual fuel controller via said CAN, to control operation of a liquid fuel supply device of the engine,
    said dual fuel controller is configured to control said diesel controller in a master-slave relationship when the engine is operating in dual fuel mode; and
    said diesel controller is configured to control all aspects of engine fueling when the engine is operating in diesel only mode.

11. The control system as recited in claim 10, further comprising a single input/output port adapted to transfer programming data from a manual interface device to one of said controllers, said network being configured to transmit programming data to the other of said controllers from said manual interface device and said one controller.

12. The control system as recited in claim 10, further comprising a third dedicated controller that is coupled to said broadband communications link and that controls another subsystem of the engine based at least on part on information input to only one of said diesel controller and said dual fuel controller and transmitted to said third controller over said CAN.

13. A dual fuel engine comprising:
    (A) a plurality of cylinders;
    (B) an air supply system configured to supply air to said cylinders;
    (C) a gaseous fuel supply system configured to supply gaseous fuel to said cylinders;
    (D) a liquid fuel supply system configured to supply liquid fuel to said cylinders;
    (E) a plurality of sensors configured to monitor operation of said engine;

(F) a dedicated dual fuel controller;

(G) a dedicated diesel controller; and (H) a controller area network (CAN) that provides two-way broadband communication between said dual fuel controller and diesel controller controllers, wherein said dual fuel controller is configured, based on information received directly from at least some of said sensors and from information received from said diesel controller via said CAN, to control operation of said gaseous fuel supply system; and said diesel controller is configured, based on information received directly from at least some of said sensors and from information received from said dual fuel controller via said CAN, to control operation of said liquid fuel supply system.

14. The engine as recited in claim 13, wherein said engine is operable in both a dual fuel mode and a diesel only mode, said dual fuel controller is configured to control said diesel controller in a master-slave relationship when said engine is operating in the dual fuel mode, said diesel controller is configured to control all aspects of engine operation when said engine is operating in the diesel only mode.

15. The engine as recited in claim 14, wherein said sensors include a single intake air pressure sensor and a single air intake temperature sensor, each of which transmits data to only one of said controllers, and wherein the other controller receives data from said intake air pressure sensor and said intake temperature sensor via the one controller and said CAN.

16. The engine as recited in claim 13, further comprising a single manual input device connected to both of said controllers via a single input/output port.

17. The engine as recited in claim 16, wherein said input/output port is connected to only one of said controllers and transmits information between said manual input device and the other controller via the one controller and said CAN.

18. The engine as recited in claim 13, further comprising a third dedicated controller that is coupled to said broadband communications link and that controls another subsystem of said engine based at least on part on information input to only one of said diesel controller and said dual fuel controller and transmitted to said third controller over said CAN.

19. A method comprising:

(A) monitoring operation of a dual fuel engine via a plurality of sensors;

(B) transmitting data from at least one of said sensors to only one of first and second dedicated controllers;

(C) transmitting the data from said at least one sensor to the other of said controllers from said one controller via a broadband communications link coupling said first and second controllers to one another;

(D) controlling operation of said engine using at least said first and second controllers, the controlling step using data transmitted by said sensors and relying on two-way communication over said broadband communications link.

20. The method as recited in claim 19, wherein said engine is operable in both a dual fuel mode and a diesel only mode, said first controller controls a gaseous fuel supply device of said engine, said second controller controls a liquid fuel supply device of said engine, and said first controller controls said second controller in a master-slave relationship when said engine is operating in the dual fuel mode.

21. The method as recited in claim 20, wherein said second controller controls all aspects of engine operation when said engine is operating in the diesel only mode.

22. The method as recited in claim 19, further comprising programming one of said first and second controllers by transmitting data from a manual interface device directly to said one controller and programming the other of said first and second controllers by transmitting data to the other controller from said manual interface device via the one controller and said broadband communications link.

23. The method as recited in claim 19, wherein the broadband communications link is a controller area network.

24. The method as recited in claim 19, further comprising controlling another subsystem of said engine using a third dedicated controller that receives information over said broadband communications link that is input to only one of said first and second controllers.

25. The method as recited in claim 24, wherein said third controller controls at least one of an EGR subsystem and a water injection subsystem.

* * * * *